(12) United States Patent
Alman

(10) Patent No.: US 6,637,452 B1
(45) Date of Patent: Oct. 28, 2003

(54) VALVE WITH SELF-CLEANING TRIM

(75) Inventor: Paul T. Alman, Marshalltown, IA (US)

(73) Assignee: Fisher Controls International, Inc., St. Louis, MO (US)

( * ) Notice: Subject to any disclaimer, the term of this patent is extended or adjusted under 35 U.S.C. 154(b) by 0 days.

(21) Appl. No.: 10/266,910

(22) Filed: Oct. 8, 2002

(51) Int. Cl.[7] .............................. F16K 3/22; F17D 3/01; B08B 9/04
(52) U.S. Cl. ................. 137/244; 15/104.05; 15/104.16; 137/625.3; 137/625.37; 251/205; 251/324
(58) Field of Search ................................ 137/242, 244, 137/15.07, 625.3, 625.37; 251/205, 324, 325; 15/104.05, 104.16

(56) References Cited

U.S. PATENT DOCUMENTS

| | | | | |
|---|---|---|---|---|
| 1,199,350 A | * | 9/1916 | Collin | 137/244 |
| 2,341,018 A | * | 2/1944 | Clapp | 137/244 |
| 3,352,316 A | * | 11/1967 | Zahn | 137/242 |
| 3,658,083 A | * | 4/1972 | Fetterolf et al. | 137/244 |
| 3,716,069 A | * | 2/1973 | Reynolds | 137/244 |
| 3,722,854 A | * | 3/1973 | Parola | 137/625.3 |
| 4,041,982 A | * | 8/1977 | Lindner | 137/625.3 |
| 4,617,963 A | * | 10/1986 | Stares | 137/625.3 |
| 5,236,014 A | * | 8/1993 | Buls et al. | 137/625.3 |
| 5,381,818 A | * | 1/1995 | Nendzig et al. | 137/242 |
| 6,382,253 B1 | | 5/2002 | McCarty et al. | |

\* cited by examiner

Primary Examiner—George L. Walton
(74) Attorney, Agent, or Firm—Marshall, Gerstein & Borun LLP

(57) ABSTRACT

The seal assembly is disclosed for use with a valve having a trim cage with an inner surface extending along in axis and a plug sized to fit inside the trim cage inner surface, wherein the plug is adapted to move along the axis thereof. A seal ring is attached to an upstream portion of the cage to effectuate a seal with the plug. The plug is equipped with a wiper seal that cleans or otherwise removes debris from the seating surface of the seal ring, an interior surface of the seal ring and an interior surface of the cage during both the opening and the closing of the valve. Thus, the valve is self-cleaning. Further, the wiper seal delays throttling action through the valve until the plug has moved a substantial distance away from the seating surface of the seal ring which reduces high pressure abrasive flow against the seating surface of the seal ring to reduce wear on the trim set.

22 Claims, 11 Drawing Sheets

VALVE WITH SELF-CLEANING TRIM

BACKGROUND

1. Technical Field

An improved fluid valve system is disclosed. More specifically, an improved valve is disclosed which includes a valve plug that is slidably received within a bore defined by a cage. A seal ring is connected to the cage and engagement with the valve plug against the seal ring closes the valve. The valve plug is equipped with a wiper seal that cleans the trim set of debris and residue each time the valve moves between opened and closed positions. As a result, the valve is equipped with a self-cleaning trim set.

2. Background of the Related Art

Valves are commonly used to control the flow characteristics of a fluid. A conventional valve includes a valve body defining an inlet, an outlet, and a fluid flow path extending between the inlet and the outlet. A throttling element, such as a plug, is disposed in the path to control fluid flow. A stem connects the valve plug to an actuator, which moves the valve plug into and out of the flow path. A conventional valve may include a cage extending across the fluid flow path and having orifices formed therein. The plug has an outer surface sized to closely fit an inner wall of the cage. As a result, the plug is slidable inside the cage between a closed position, in which the plug obstructs the orifices, and an open position, in which the plug is clear of at least a portion of the orifices. The plug can also be positioned between fully open and closed positions to control the flow rate of fluid through the cage.

To effect a seal between the plug and the cage, a seal ring can be disposed at the upstream end of the cage. The seal ring can provide a seating surface for a seat disposed at a distal or upstream end of the valve plug. The combination of the seat on the valve plug and the seating surface on the seal ring define what is known as the trim set for the valve. One problem associated with currently available valve systems is that the fluid flowing to the valve can contain abrasive particles and fluids that can crystallize during pressure reduction. These particles and crystals can cause premature wear to the trim set or adversely affect the valves ability to seal properly. While some valve systems incorporate so-called wiper seals to clean the valve trim, these known wiper seal systems do not clean the valve trim immediately before and after sealing. Further, known wiper seals do not protect the seating surfaces from being exposed to fluid flow as the valve is initially opened. As a result, the seating services are exposed to high pressure flow which, as discussed above, can contain abrasive particles and crystals resulting in premature seating surface wear.

As a result, there is a need for an improved valve system with a self-cleaning mechanism to clean the valve trim and further to protect the seating surfaces from initial fluid flow during the opening of the valve or the initial throttling of the valve.

SUMMARY OF THE DISCLOSURE

An improved valve system is disclosed which comprises a cage defining a bore extending along an axis. A plug is sized to fit within the bore and is adapted for slidable movement along the bore axis between closed or opened positions. The plug comprises a proximal end or downstream connected to a valve stem and a distal or upstream end. The plug further comprises a seat disposed between the proximal and distal ends thereof. The valve further comprises a seal ring disposed between the distal end of the plug and the cage when the plug is in the closed or sealed position. The seal ring comprises a seating surface for engaging the seat of the plug when the plug is in the closed position. The plug further comprises a wiper seal disposed between the seat and the distal end thereof. The wiper seal comprises an outside surface adapted to engage the interior surface of the cage and the seating surface of the sealing ring as the plug is moved between closed and throttle positions.

As a result of its placement between the seat and the distal end of the plug, the wiper seal engages the seating surface before the seat as the plug is moved from a throttle to a sealed position. Further, as the seat of the plug is moved off of the seating surface as the plug is moved from the sealed to a throttle position, the wiper seal again engages the seating surface and, further, engages a remaining portion of the seal ring and further engages a distal or upstream end of the cage before the plug reaches an initial throttle position. As a result, the wiper seal cleans the seating surface and the upstream portion of the cage when the plug is moved from a throttling to a sealed position and further when the plug is moved from a sealed position to an initial throttling position.

In a refinement, the wiper seal comprises a material sufficiently rigid to scrape foreign material from the seating surface as the plug moves in either axially direction and further the material of the wiper seal is sufficiently resilient to minimize damage to the seating surface of the sealing ring and the interior surface of the cage.

In a further refinement, the wiper seal comprises poly (etheretherketone) (PEEK) or another suitable high performance plastic such as ultra-high molecular weight polyethylene (UHMWPE).

In another refinement, the wiper seal is an elastic seal that is biased radially outwardly to provide good engagement between the wiper seal and the seating surface as well as the interior surface of the cage.

In another refinement, the wiper seal comprises two spaced-apart wiper seals, both disposed between the seat of the plug and the distal end or upstream end of the plug. One or both of the seals can be fabricated from PEEK and one or both of the seals can be a spring-biased metallic seal. In a further refinement, the upper seal is made from PEEK and the lower seal is the spring-biased metallic seal. One or both of the seals could also be fabricated from UHMWPE.

In yet another refinement, the plug further comprises a plastic or "soft-seat" seal disposed between the wiper seal and the seat. The soft-seat seal may be accommodated in a common groove with the wiper seal or, the soft-seat seal may be disposed in a separate groove disposed between the wiper seal and the seat of the plug.

Other features and advantages of the disclosed valves and wiper seals will become apparent to those skilled in the art from the following detailed description and accompanying drawings.

BRIEF DESCRIPTION OF THE DRAWINGS

FIGS. 3–8 sequentially illustrate movement of the valve plug from a sealed or closed position to a throttling or open position and, conversely, FIGS. 8–3 sequentially illustrate movement of the valve plug from a throttling position to a sealed position;

It should be understood that the drawings are not necessarily to scale and that the embodiments are illustrated by graphic symbols, phantom lines, diagrammatic representations and fragmentary views. In certain instances, details which are not necessary for an understanding of the disclosed valves and wiper seals or which render other details difficult to perceive may have been omitted. It should be understood, of course, that this disclosure is not necessarily limited to the particular embodiments illustrated herein.

DETAILED DESCRIPTION OF THE PRESENTLY PREFERRED EMBODIMENTS

Figure 1:
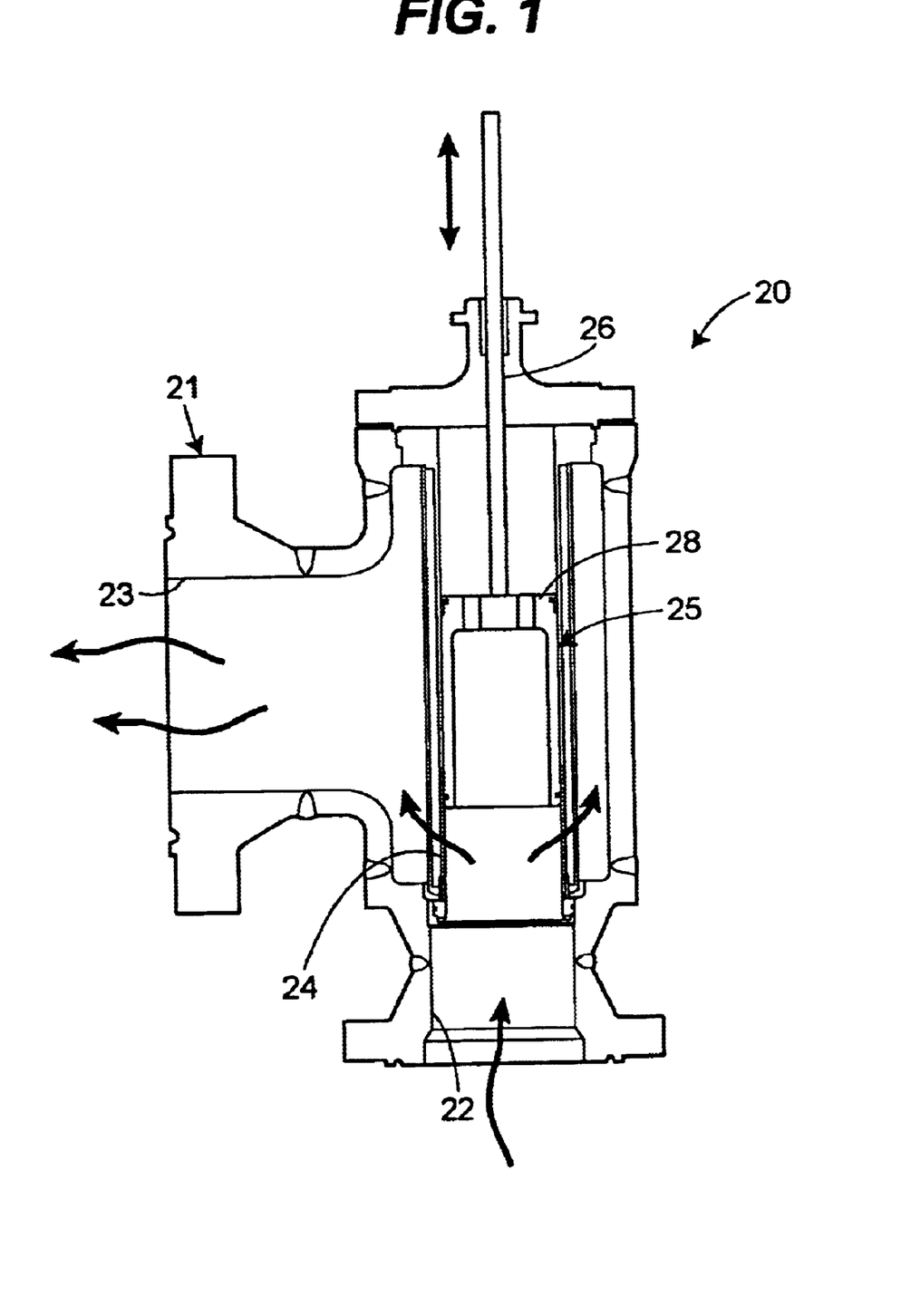
FIG. 1 is a sectional view of a disclosed valve in an open or throttle position.
Figure 2:
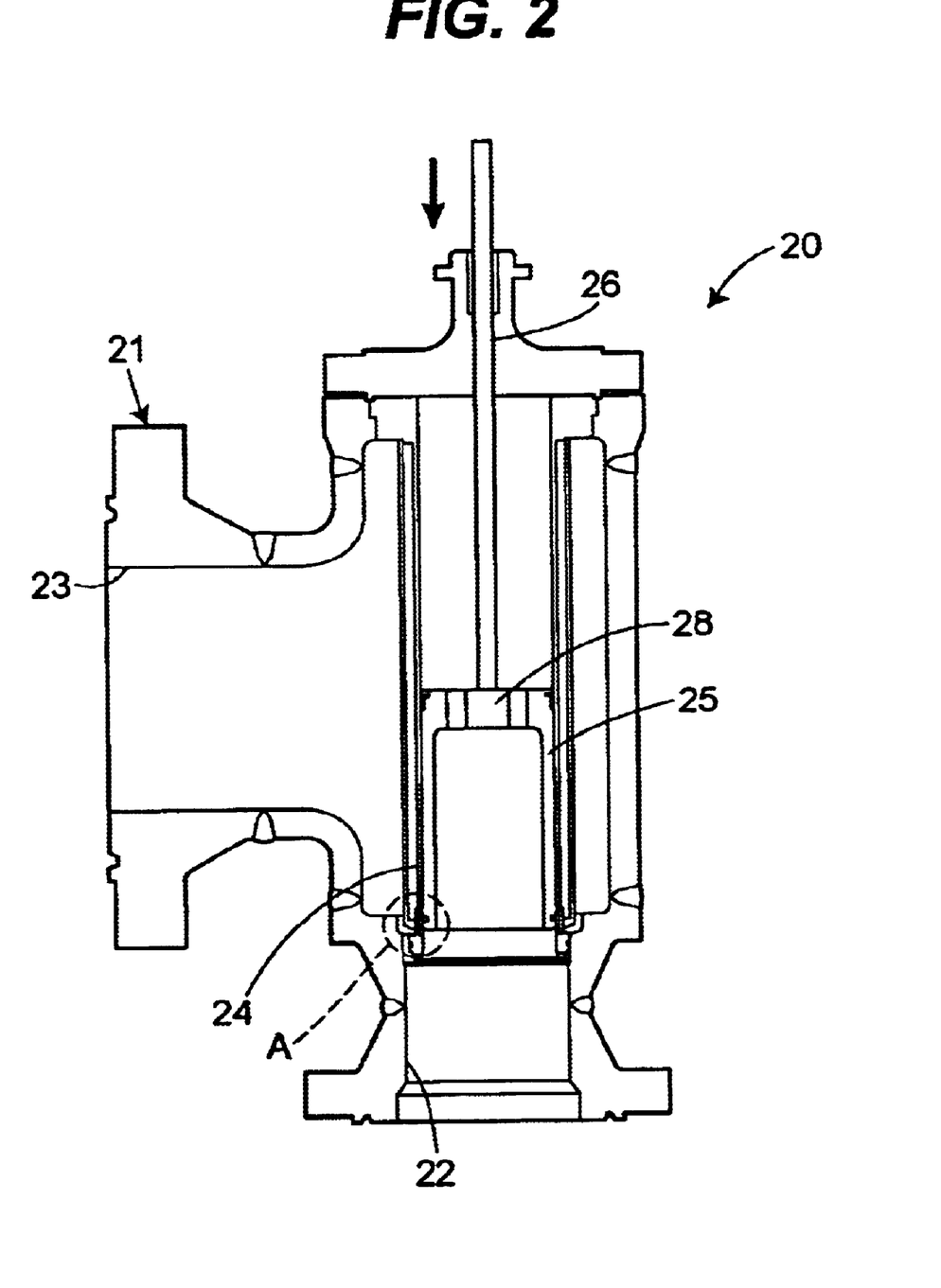
FIG. 2 is a sectional view of the valve of FIG. 1 in a closed or sealed position.

FIGS. 1 and 2 illustrate a valve 20 with a valve body 21 that includes an inlet 22 and an outlet 23. Fluid flows through the valve body 21 in the direction indicated by the arrows. To control fluid through the valve body 21, a permeable cage 24 is disposed between the inlet 22 and 23. A valve plug 25 is accommodated within the axial bore defined by the cage 24. The plug 25 is connected to a stem 26 which, in turn, is connected to an actuator (not shown) for moving the plug 25 between an open or throttle position as shown in FIG. 1 in a closed or sealed position as shown in FIG. 2. The detail A which illustrates the sealing, cleaning and throttling aspects of the valve 20 is further illustrated in FIGS. 3–8.

Figure 3:
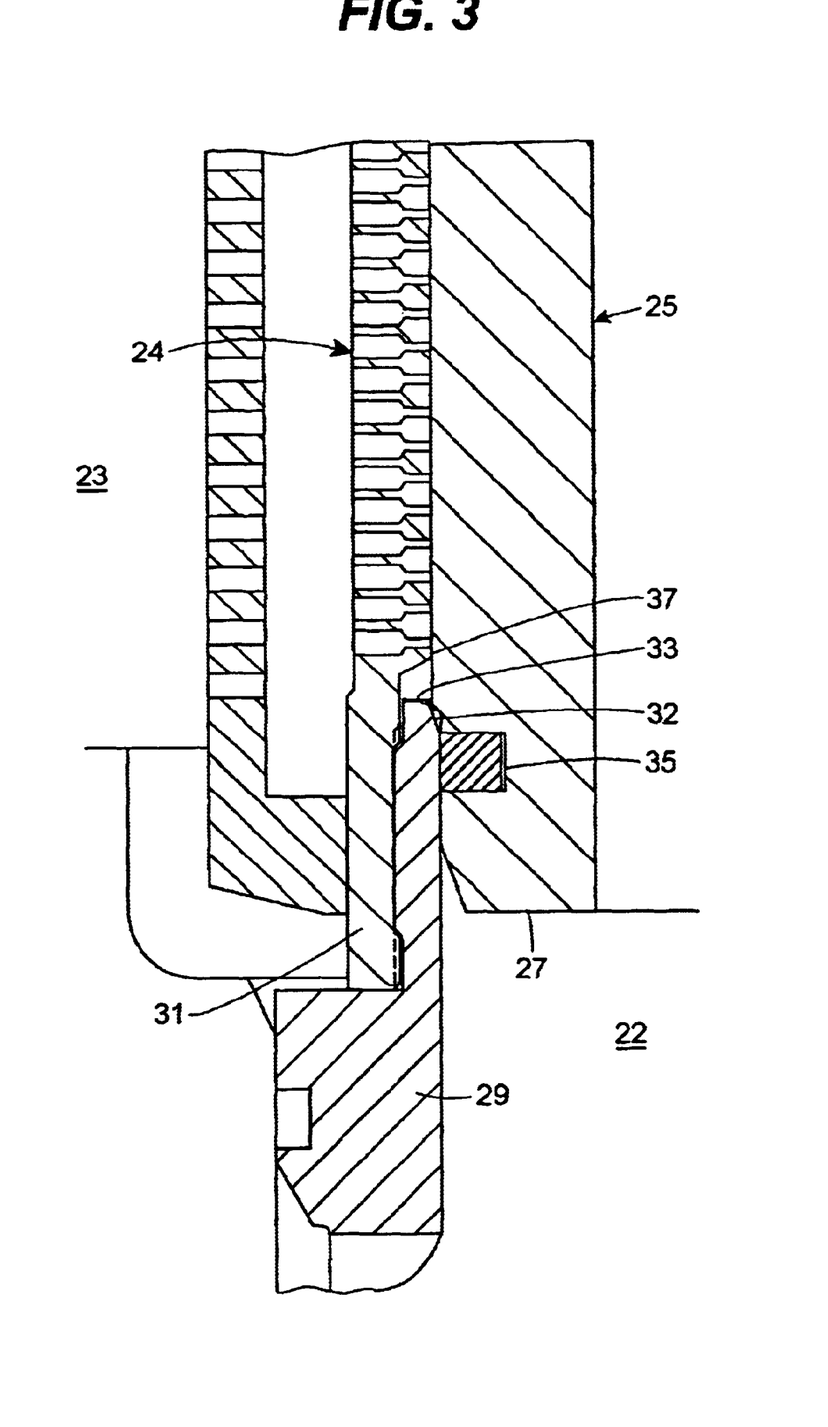
FIG. 3 is a partial expanded view of the valve shown in FIGS. 1 and 2, in the closed or sealed position.

Turning to FIGS. 3–8, movement of the valve plug 25 from the closed or sealed position (FIG. 3) to an open or throttling position (FIG. 8) will now be described. Turning first to FIG. 3, the plug 25, which includes a upstream or distal end 27 and a downstream or proximal end 28 (see FIGS. 1 and 2) is shown in the fully closed or sealed position. Specifically, a sealing ring 29 is mounted to a distal or upstream end 31 of the cage 24. The sealing ring 29 provides a seating surface 32 for engaging a seat 33 of the plug 25. In the position shown in FIG. 3, there is no fluid communication between the inlet 22 and the outlet 23.

Figure 4:
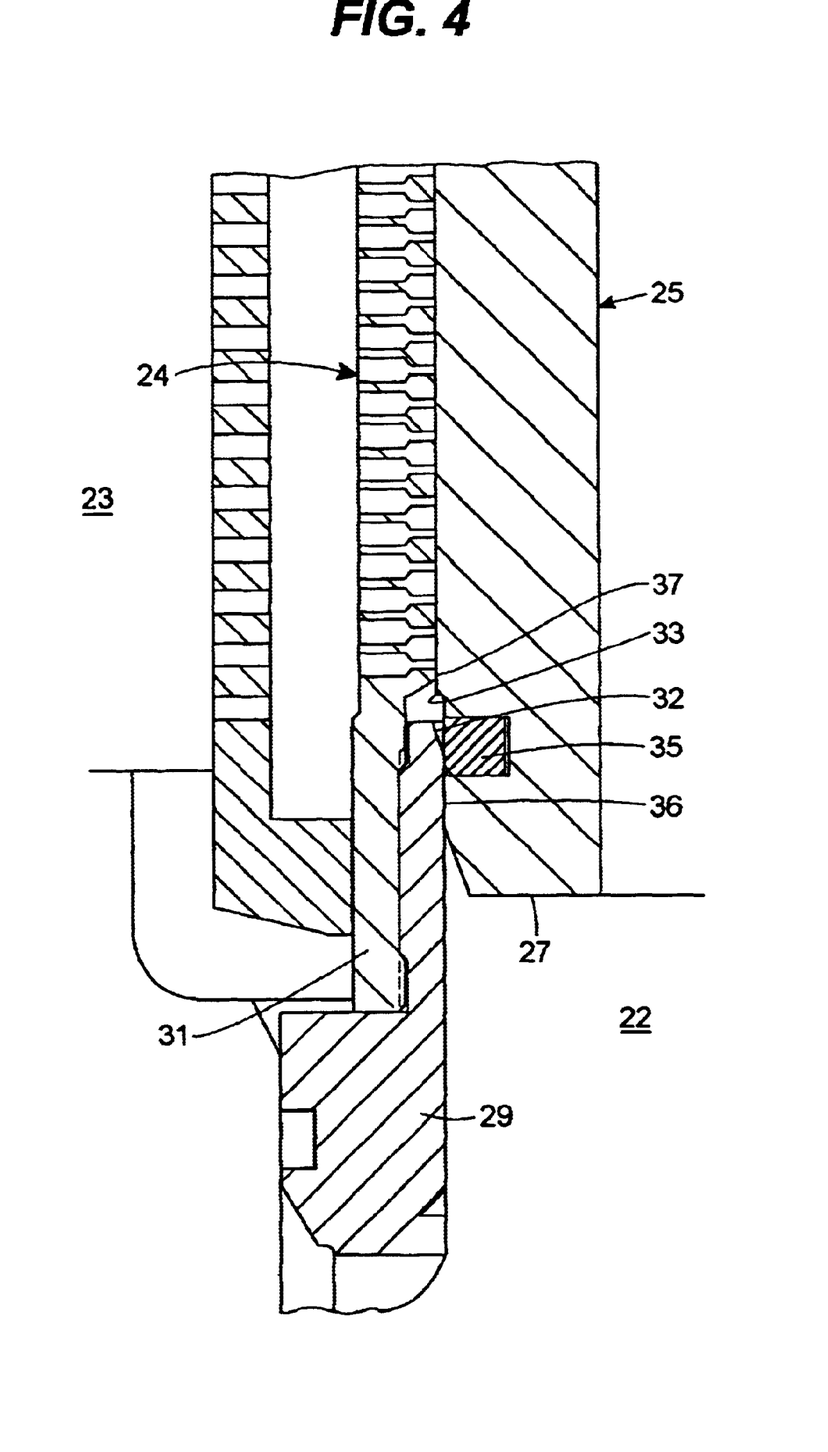
FIG. 4 is another partial expanded view of the valve shown in FIGS. 1 and 2 illustrating movement of the valve plug seat off of the seating surface of the sealing ring prior to the valve plug reaching a throttle position.
Figure 5:
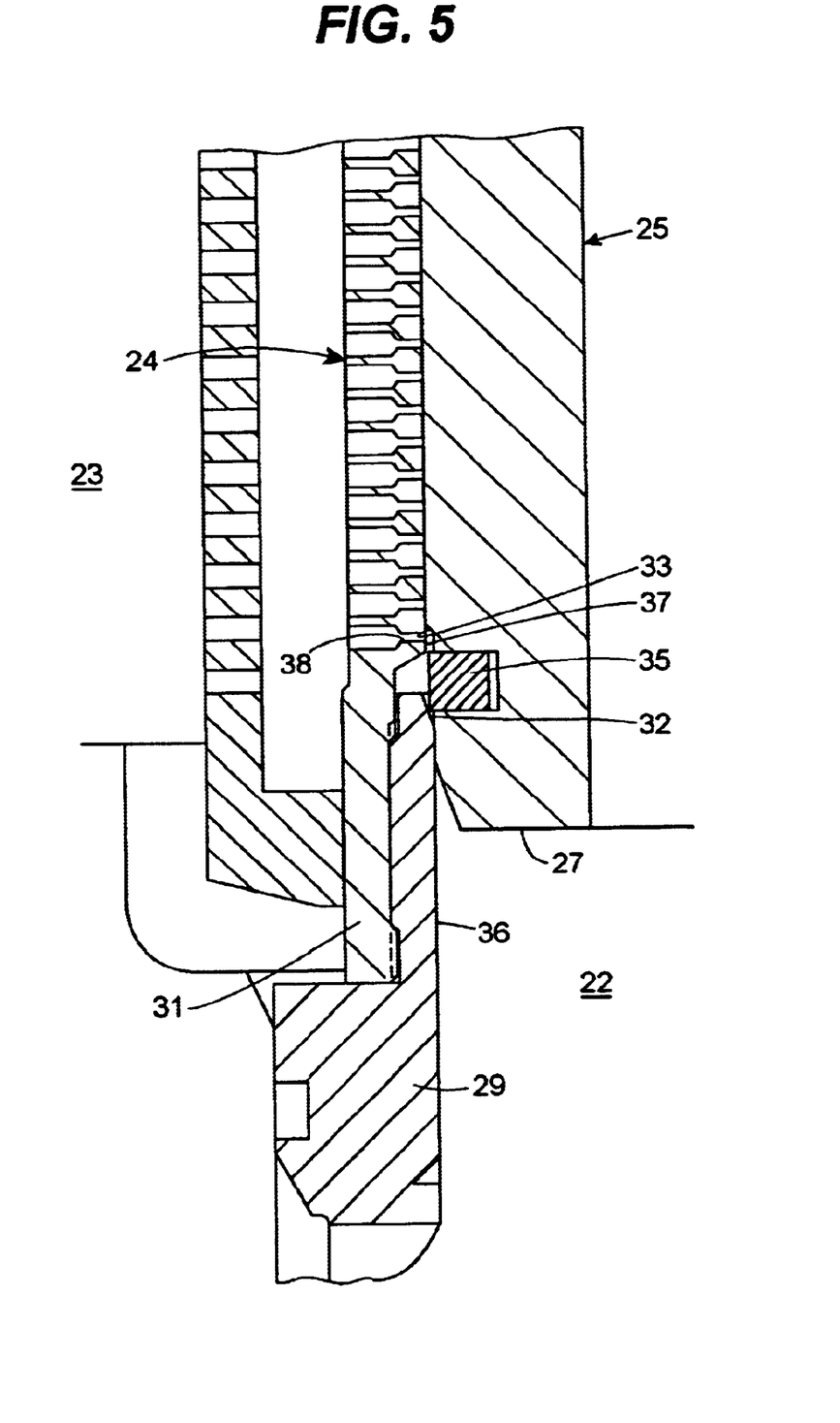
FIG. 5 is another partial expanded view of the valve shown in FIGS. 1 and 2 illustrating further upward axial movement of the valve plug and illustrating engagement of the wiper seal against the sealing ring which prevents throttling even though the seat of the valve plug no longer engages the seating surface of the seal ring.
Figure 6:
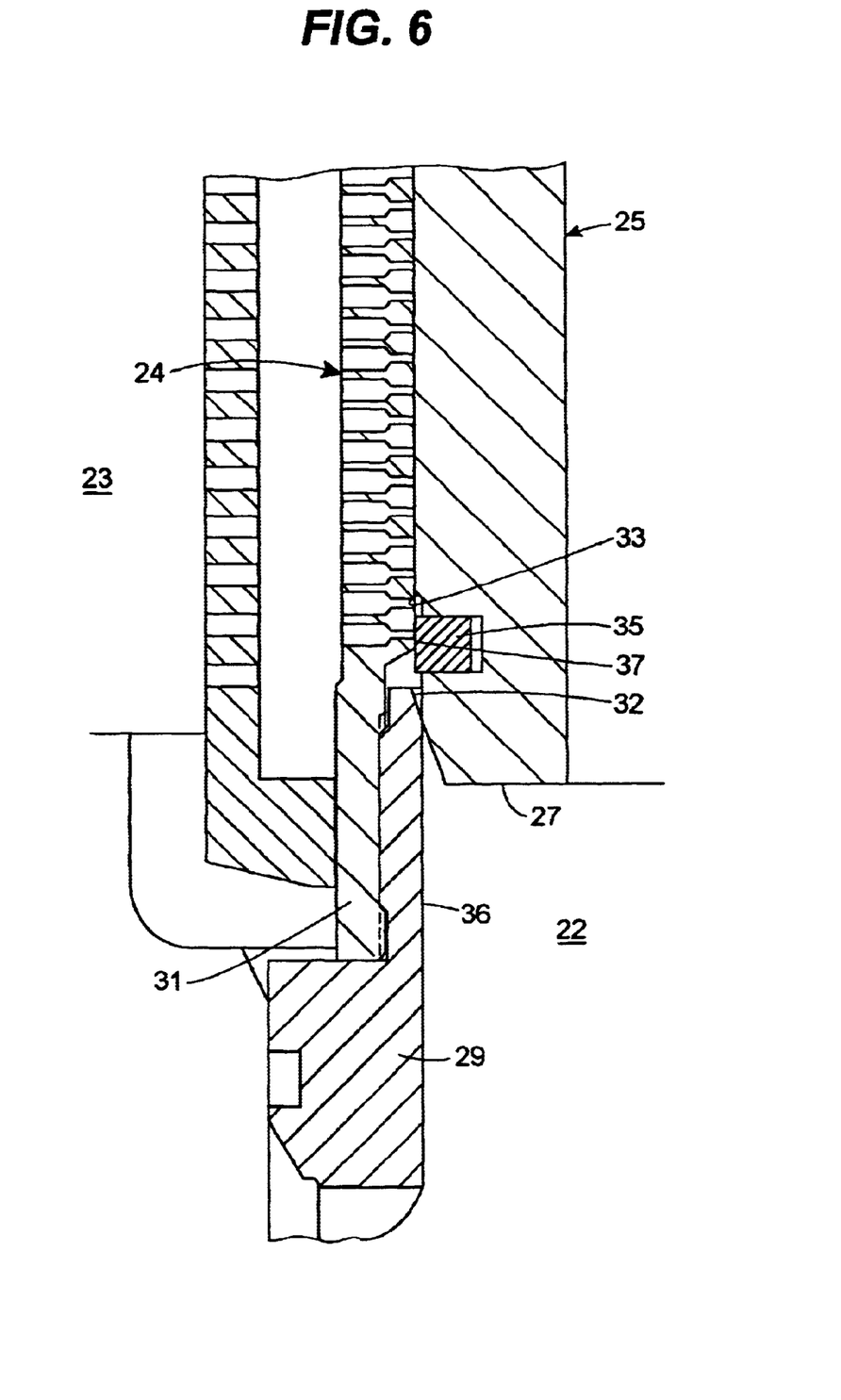
FIG. 6 is yet another partial expanded view of the valve of FIGS. 1 and 2 illustrating the wiper ring engaging an inner surface of the cage to prevent throttling even though the seat of the valve plug is disposed above the seating surface of the seal ring.

Turning to FIGS. 4–6, the action of the wiper seal 35 will now be described. At the outset, it will be noted that the sequence illustrated in FIGS. 4–8 will be described as movement of the valve plug 25 from the fully closed or sealed position shown in FIG. 3 to the throttling position shown in FIG. 8. However, the reverse movement of the plug 25 from the throttle position shown in FIG. 8 to the fully sealed or closed position shown in FIG. 3 also results in the same cleaning and sealing actions of the wiper seal 35.

Figure 7:
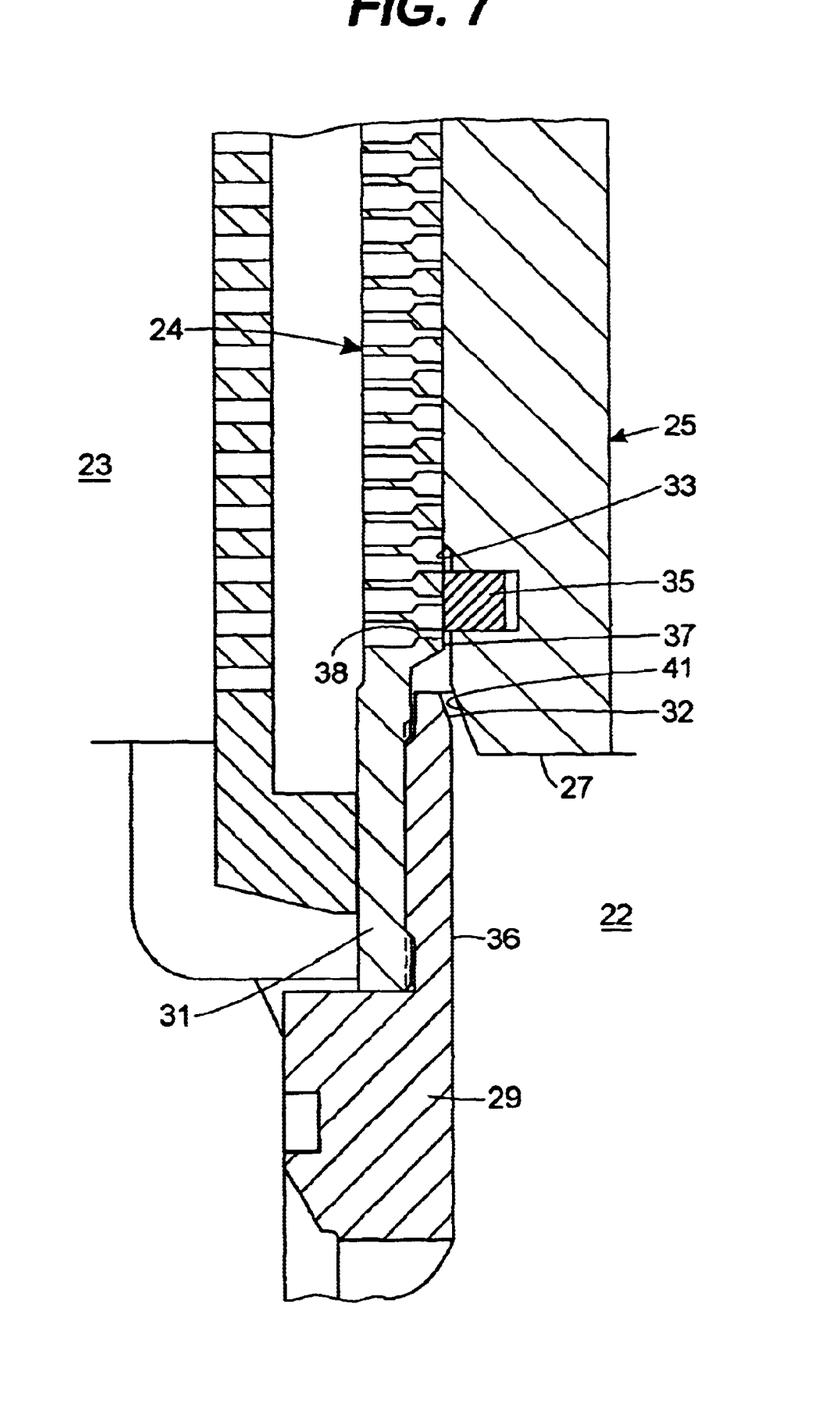
FIG. 7 is yet another partial expanded view of the valve shown in FIGS. 1 and 2 in an initial throttling position.
Figure 8:
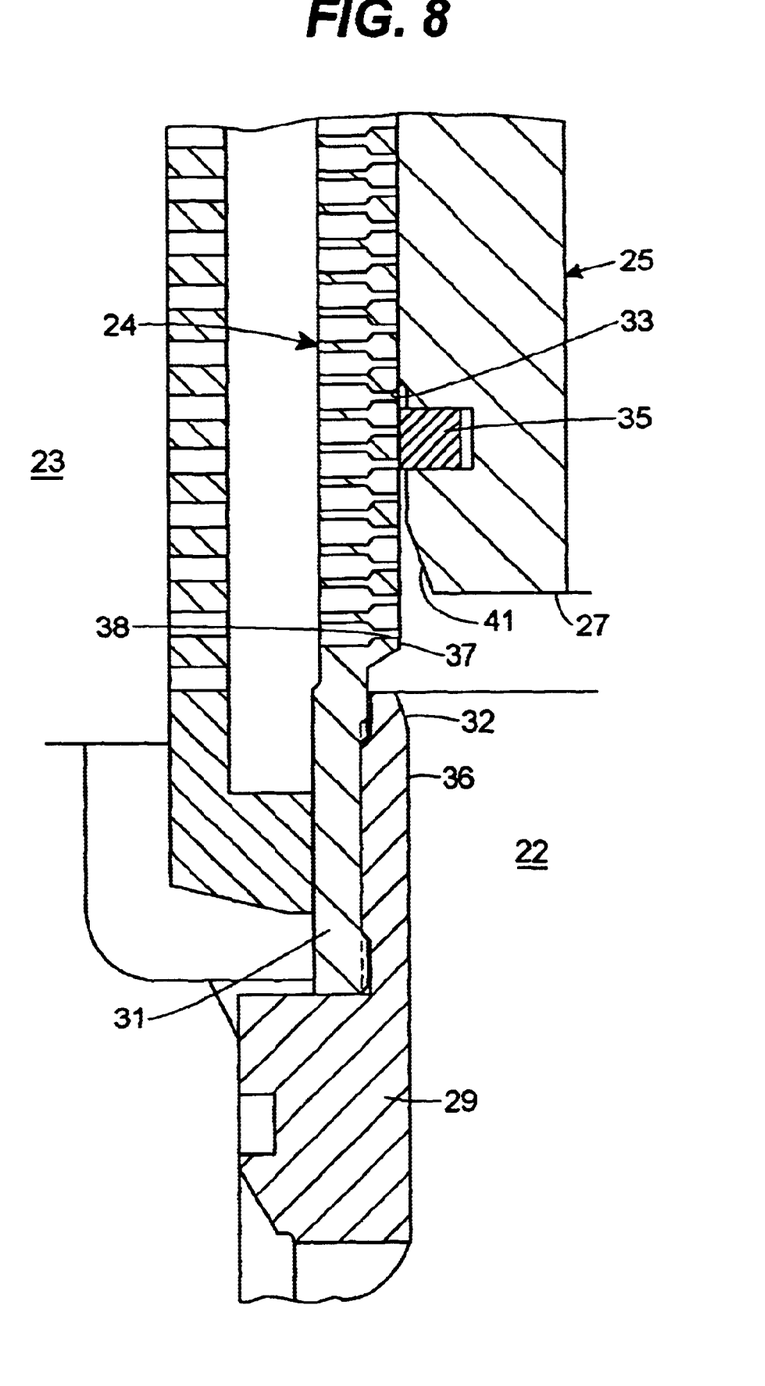
FIG. 8 is yet another partial expanded view of the valve of FIGS. 1 and 2 in a throttling position.

Turning to FIG. 4, as the plug 25 is moved upward in the orientation shown in FIG. 4, the seat 33 of the plug 25 disengages from the seating surface 32 of the sealing ring 29. However, fluid communication between the inlet 22 and outlet 23 is still prevented by the sealing action of the wiper seal 35 against the interior surface 36 of the sealing ring 29. Continuing with this sequence, and now referring to FIG. 5, as the plug 25 continues to move upward, the wiper seal 35 engages the seating surface 32 of the sealing ring 29 and communication between the inlet 22 and outlet 23 is still prevented. Turning to FIG. 6, the plug 25 has continued to move upwardly and, as shown in FIG. 6, the wiper seal 35 engages an interior surface 37 of the cage 24. As a result, fluid communication between the inlet 22 and the outlet 23 is still prevented. An initial throttling position is illustrated in FIG. 7. Specifically, the wiper seal 35 has moved upward past an initial orifice 38 of the cage 24. As a result, initial throttling is allowed to proceed through the orifice 38. It will be noted here that a substantial gap is provided between the beveled surface 41 of the plug 25 and the seating surface 32 of the sealing ring 29. This gap is substantially larger than the orifice 38 of the cage 24. As a result, the high pressure flow exists at the orifice 38 and, in the event crystals or particles are entrained in the fluid flow between the inlet 22 and the outlet 23, the abrasive nature of the flow will be imparted to the orifice 38, as opposed to the seating surface 32. Thus, the action of the wiper seal 35 in delaying throttling until the position shown in FIG. 7 acts to protect the seating surface 32 from undue and premature wear.

Further, as clearly evident from the sequence illustrated in FIGS. 4–7, the wiper seal 35 also acts to clean the seating surface 32 as well as the internal surface 37 of the cage 24. Now, reversing the sequence illustrated in FIGS. 4–7, as the plug 25 moves downward from a final throttling position (FIG. 7) towards the closed or sealed position (FIG. 3), the wiper seal 35 engages and cleans the internal surface 37 of the cage (FIGS. 6 and 7) and further engages and cleans the seating surface 32 of the sealing ring (FIG. 5) as well as the internal surface 36 of the sealing ring 29 (FIG. 4) prior to engagement of the seat 33 of the plug 25 against the seating surface 32 of the sealing ring 29 (FIG. 3). As a result, the wiper seal 35 cleans the trim set, i.e., the seating surface 32, interior surface 37 of the cage 24, and the interior surface 36 of the sealing ring 31 during both the opening and closing of the valve 20. As a result, not only is the valve 20 self-cleaning, the delayed throttling as illustrated by the sequence shown in FIGS. 4–7 limits the exposure of the seating surface 32 to abrasive fluid flow.

Figure 9:
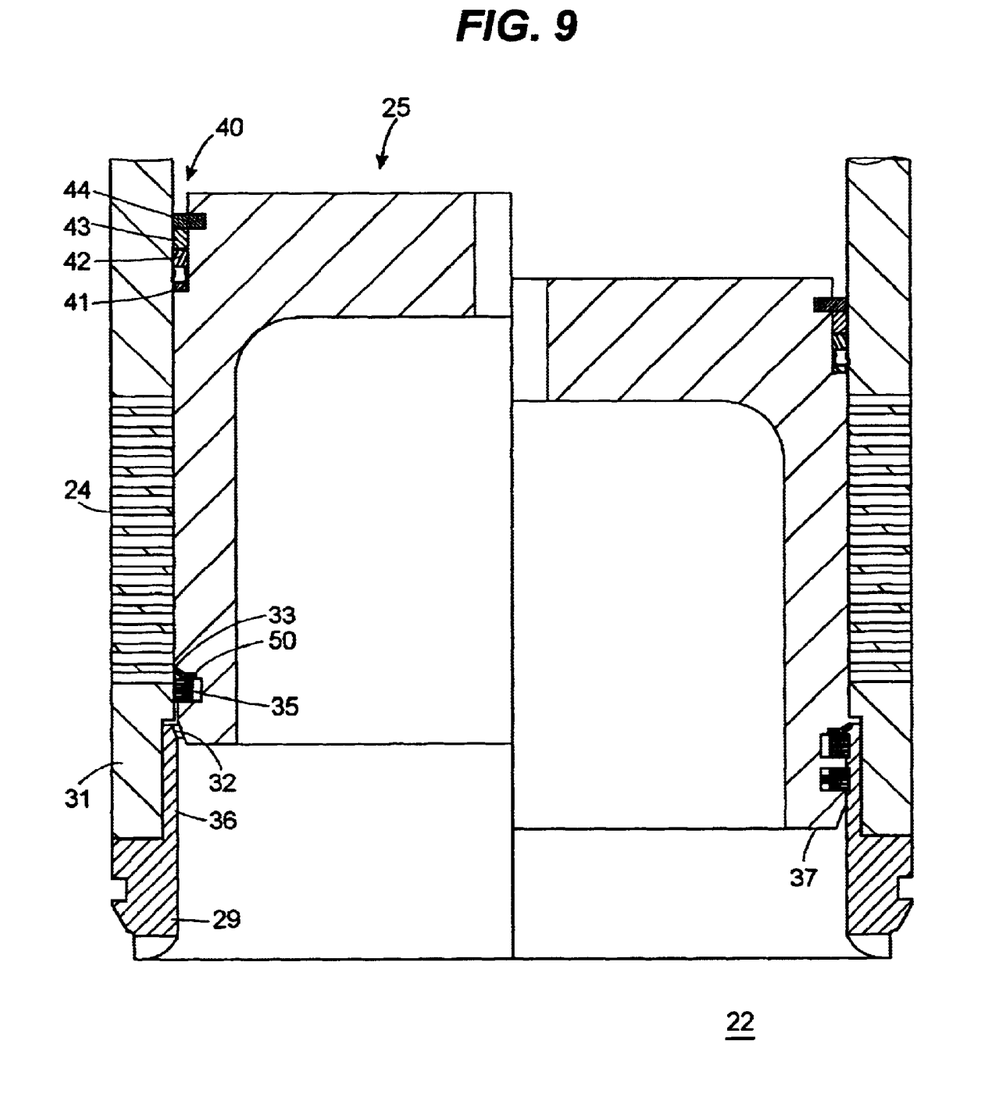
FIG. 9 is a sectional view of an alternative embodiment of a valve plug with two wiper seals, further illustrating the valve plug in a fully closed or sealed position as well as a sealed position just prior to reaching a throttling position.
Figure 10:
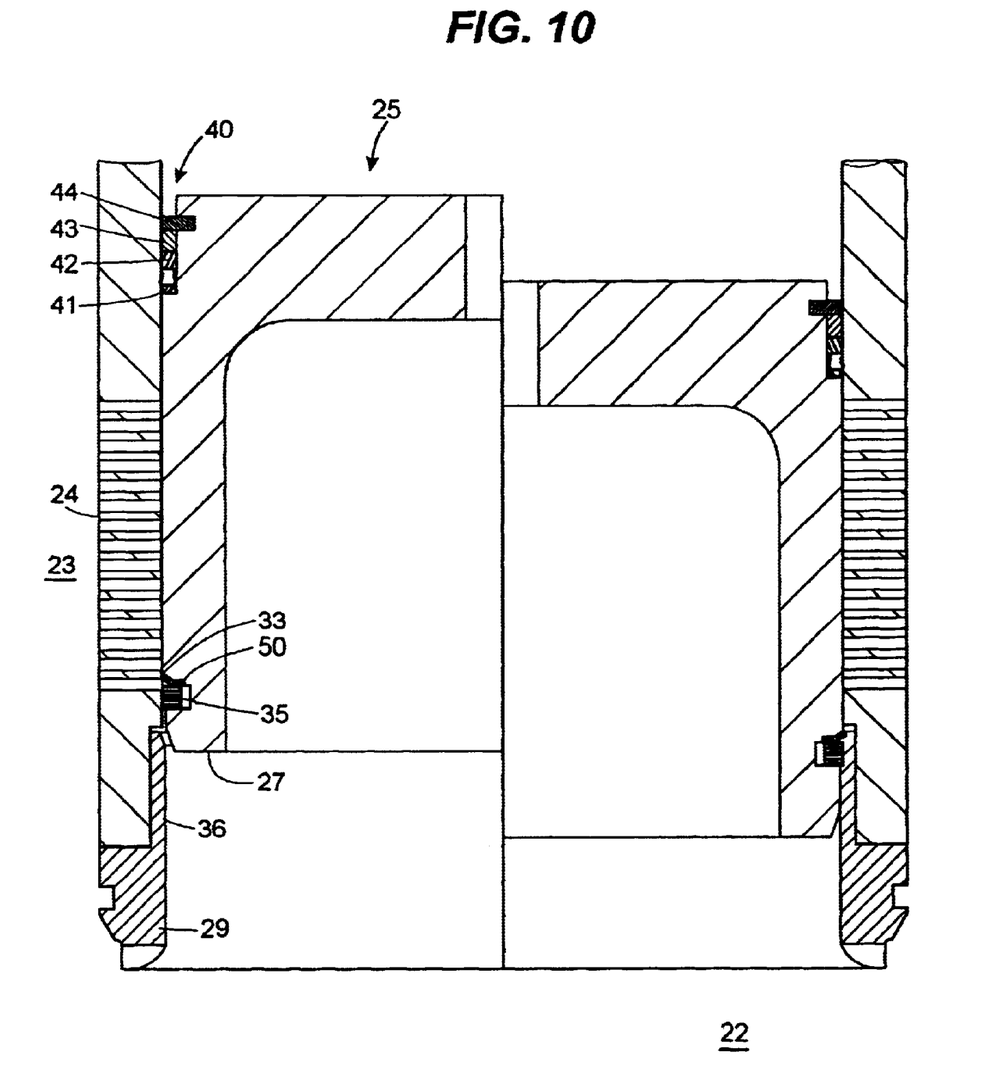
FIG. 10 is a sectional view of yet another valve plug equipped with a wiper seal and a plastic seal disposed immediately above the wiper seal and between the wiper seal and the seat of the plug.
Figure 11:
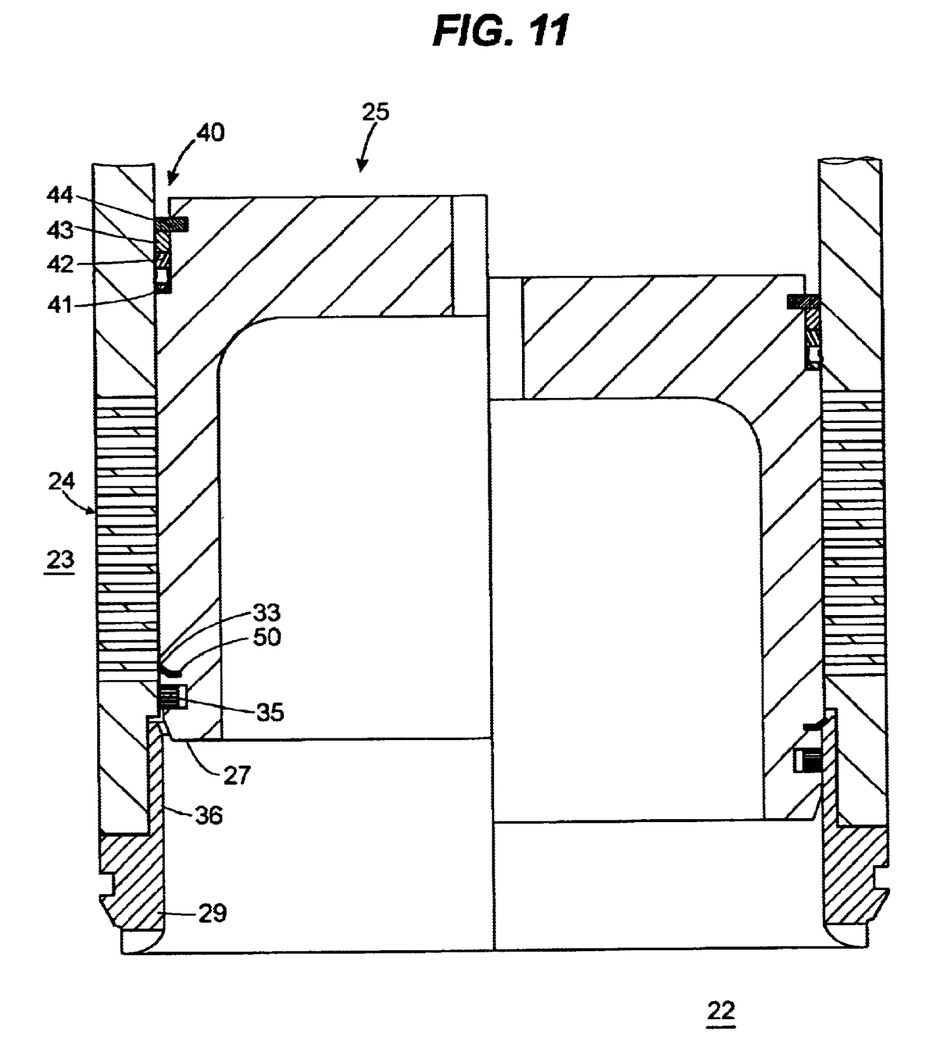
FIG. 11 is a sectional view illustrating yet another embodiment of a valve plug with a wiper seal and a separate plastic seal disposed in a circumferential groove above the wiper seal and immediately below the plug seat.

Alternative embodiments of the wiper valve system illustrated in FIGS. 1–8 are illustrated in FIGS. 9–11. Specifically, turning to FIG. 9, two wiper seals 35a and 35b are disposed on the plug 25 between the seat 33 and the distal end 27 of the plug. One or both of the seals 35a, 35b may be fabricated from PEEK. If increase wear resistance is desired, one or both of the seals 35a, 35b may be metallic seals. Metallic seals are also effective in preventing clearance flow. FIG. 9 also illustrates the plug 25 in a fully closed and sealed position (see the right side of FIG. 9) and in a sealed position between the fully closed or sealed position and an initial throttling position (see the left side of FIG. 9). Preferably, if the lower seal 35b is a metallic seal, it also includes a biasing ring shown at 35c. One or both of the seals 35a, 35b may also be made from UHMWPE.

FIGS. 9–11 also illustrate the upper seal assembly 40 which includes a spring biased seal 41, a back up ring 42, a metal seal 43 and a snap ring 44.

Turning to FIG. 10, in addition to the wiper seal 35c, an additional "soft-seat" type seal 50 is disposed immediately above the wiper seal 35 and which effectively covers the seat 33 for enhancing the seal between the plug 25 and the seating surface 32 of the sealing ring 29 (see the right side of FIG. 10). Finally, in a further variation, the additional seal 50 and the wiper seal 35 are spaced apart from one another, but still both below the seat 33 of the plug 25.

Preferred materials for fabricating the wiper seal 35 include but are not limited to PEEK and UHMWPE.

Referring back to FIG. 9, if the upper seal 35a is fabricated from PEEK, the lower seal 35b can be fabricated from a different material, such as UHMWPE or the lower seal 35b may be a metallic seal with a metallic biasing ring 35c. If the seal 35b is a metallic seal, iron-nickel alloys can be utilized along with other ductile alloys. One said suitable alloy is the ductile Ni-resist iron class D3. Other suitable ductile alloys will also be apparent to those skilled in the art. The biasing ring 35c can be made from INCONEL® X750 or other suitable materials that will be apparent to those skilled in the art.

Preferred materials for the seal 50 include but are not limited to UHMWPE, polytetrafluoroethylene (TEFLON®), and chlorotrifluoroethylene (CTFE), which is particularly suitable for cryogenic applications. PEEK may also be utilized for the seal 50 but may be too hard for most applications.

The foregoing detailed description has been given for clearness of understandingly only, and no unnecessary limitation should be understood therefrom, as modifications would be obvious to those skilled in the art.

What is claimed is:

1. A valve comprising:
   a cage defining a bore extending along an axis,
   a plug sized to fit inside the bore and adapted for slidable movement along the bore axis between closed and throttle positions, the plug comprising a proximal end connected to a stem and a distal end, the plug further comprising a seat disposed between the proximal and distal ends thereof,
   a seal ring disposed between the distal end of the plug and the cage when the plug is in the closed position, the seal ring comprising a seating surface for engaging the seat of the plug when the plug is in the closed position
   the plug further comprising a wiper seal disposed between the seat and distal end thereof, the wiper seal comprising an outside surface adapted to engage the bore and the seating surface of the sealing ring as the plug is moved between the closed and throttle positions.

2. The valve of claim 1 wherein the wiper seal comprises material sufficiently rigid to scrape foreign material from the seating surface as the plug moves yet sufficiently resilient to minimize damage to the seating surface.

3. The valve of claim 1, in which the wiper seal material comprises a high temperature thermoplastic.

4. The valve of claim 3 wherein the wiper seal material substantially maintains rigidity and resilience in process temperatures of at least 450° F.

5. The valve of claim 1, in which the wiper seal material comprises a material selected from the group consisting of PEEK, UHMWPE and metallic alloy comprising iron and nickel.

6. The valve of claim 1 wherein the plug comprises two spaced apart wiper seals disposed between the seat and the distal end of the plug.

7. The valve of claim 6 wherein the two spaced apart wiper seals include an upper wiper seal and a lower wiper seal with the upper wiper seal disposed between the seat and the lower wiper seal,
   the upper wiper seal being fabricated from PEEK or a metal,
   the lower wiper seal being fabricated from PEEK or a metal.

8. The valve of claim 1 wherein the plug further comprises a soft-seat-type seal disposed between the wiper seal and the seat.

9. The valve of claim 8 wherein the soft-seat-type seal is fabricated from a material selected from the group consisting of UHMWPE, polytetrafluoroethylene and CTFE.

10. The valve of claim 8 wherein the soft-seat-type seal and the wiper seal are accommodated in a groove disposed in the plug.

11. The valve of claim 8 wherein the wiper seal is accommodated in a first groove disposed in the plug and the soft-seat-type seal is accommodated in a second groove disposed in the plug, the second groove being disposed between the first groove and the seat.

12. The valve of claim 1 wherein the wiper seal is an expanding seal that is biased radially outwardly.

13. A valve comprising:
   a cage defining a bore extending along an axis,
   a plug sized to fit inside the bore and adapted for slidable movement along the bore axis between closed and throttle positions, the plug including a seat, the plug further comprising a proximal end connected to a stem and a distal end with a seat disposed therebetween, the plug further comprising a circumferential slot disposed between the seat and the distal end, the circumferential slot accommodating a radially expanding wiper seal,
   a seal ring disposed between the plug and the cage when the plug is in the closed position, the seal ring comprising a seating surface for engaging the seat of the plug when the plug is in the closed position,
   the radially expanding wiper seal comprising an outside surface adapted to engage the cage and the seating surface as the plug is moved between the closed and throttle positions, the radially expanding wiper seal comprising a material sufficiently rigid to scrape foreign material from a surface of the cage and from the seating surface as the plug moves between the closed and throttle positions yet sufficiently resilient to minimize damage to the seating surface.

14. The valve of claim 13, in which the wiper seal material comprises a high temperature thermoplastic.

15. The valve of claim 13 wherein the wiper seal material substantially maintains rigidity and resilience in process temperatures of at least 450° F.

16. The valve of claim 15, in which the wiper seal material comprises a material selected from the group consisting of a material selected from the group consisting of PEEK, UHMWPE and metallic alloy comprising iron and nickel.

17. The valve of claim 13 wherein the plug comprises two spaced apart wiper seals disposed between the seat and the distal end of the plug.

18. The valve of claim 17 wherein the two spaced apart wiper seals include an upper wiper seal and a lower wiper seal with the upper wiper seal disposed between the seat and the lower wiper seal, the upper wiper seal being fabricated from PEEK, the lower wiper seal being fabricated from a metal.

19. The valve of claim 13 wherein the plug further comprises a soft-seat-type seal disposed between the wiper seal and the seat.

20. The valve of claim 18 wherein the soft-seat-type seal and the wiper seal are both accommodated in a groove disposed in the plug.

21. The valve of claim 18 wherein the wiper seal is accommodated in a first groove disposed in the plug and the soft-seat-type seal is accommodated in a second groove disposed in the plug, the second groove being disposed between the first groove and the seat.

22. The valve of claim 18 wherein the soft-seat-type seal comprises a material selected from the group consisting of UHMWPE, polytetrafluorethylene and CTFE.

\* \* \* \* \*

UNITED STATES PATENT AND TRADEMARK OFFICE
CERTIFICATE OF CORRECTION

PATENT NO. : 6,637,452 B1  Page 1 of 1
DATED : October 28, 2003
INVENTOR(S) : Paul T. Alman It is certified that error appears in the above-identified patent and that said Letters Patent is hereby corrected as shown below:

<u>Drawings,</u>
FIG. 2, please delete "2B" and replace with -- 28 --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,637,452 B1 Page 1 of 2
DATED : October 28, 2003
INVENTOR(S) : Paul T. Alman It is certified that error appears in the above-identified patent and that said Letters Patent is hereby corrected as shown below:

Drawings,
Sheet 2 of 11, FIG. 2, please delete "2B" and replace with -- 28 --.
Please delete drawing page 9, FIG. 9, and insert the attached drawing page 9, FIG. 9.

Signed and Sealed this

Ninth Day of August, 2005

JON W. DUDAS
*Director of the United States Patent and Trademark Office*

FIG. 9